(12) United States Patent
Miao et al.

(10) Patent No.: US 10,680,856 B1
(45) Date of Patent: Jun. 9, 2020

(54) THERMOMETER-ENCODED UNROLLED DFE SELECTION ELEMENT

(71) Applicant: Credo Technology Group Limited, Grand Cayman (KY)

(72) Inventors: Kaibo Miao, San Jose, CA (US); Haihui Luo, San Jose, CA (US); Xuemei Liu, Milpitas, CA (US)

(73) Assignee: CREDO TECHNOLOGY GROUP LIMITED, Grand Cayman (KY)

( * ) Notice: Subject to any disclaimer, the term of this patent is extended or adjusted under 35 U.S.C. 154(b) by 0 days.

(21) Appl. No.: 16/211,933

(22) Filed: Dec. 6, 2018

(51) Int. Cl.
*H04L 25/03* (2006.01)
*H04L 27/06* (2006.01)

(52) U.S. Cl.
CPC .. *H04L 25/03057* (2013.01); *H04L 25/03324* (2013.01); *H04L 27/06* (2013.01)

(58) Field of Classification Search
CPC ......... H04L 25/03057; H04L 25/03324; H04L 27/06; H04L 2025/03363; H04L 25/03146; H04L 25/03885; H04L 2025/03668
See application file for complete search history.

(56) References Cited

U.S. PATENT DOCUMENTS

| | | | | |
|---|---|---|---|---|
| 5,701,095 A | * | 12/1997 | Ohsawa | H03K 17/693 327/410 |
| 8,301,036 B2 | | 10/2012 | He | |
| 9,071,479 B2 | | 6/2015 | Qian et al. | |
| 9,178,552 B1 | * | 11/2015 | Satarzadeh | H04L 25/03057 |
| 2012/0314756 A1 | * | 12/2012 | Leibowitz | H04L 25/03146 375/233 |
| 2013/0194112 A1 | * | 8/2013 | Harwood | H03M 7/00 341/50 |
| 2016/0261435 A1 | * | 9/2016 | Musah | H04L 25/03019 |
| 2016/0277219 A1 | * | 9/2016 | Venkatram | H04L 7/033 |

OTHER PUBLICATIONS

V. Stojanovic et al., "Autonomous dual-mode (PAM2/4) serial link transceiver with adaptive equalization and data recovery," in IEEE Journal of Solid-State Circuits, vol. 40, No. 4, pp. 1012-1026, Apr. 2005.

\* cited by examiner

*Primary Examiner* — Sophia Vlahos
(74) *Attorney, Agent, or Firm* — Ramey & Schwaller LLP; Daniel J. Krueger

(57) ABSTRACT

A disclosed DFE selection element reduces the degree of unrolling that might otherwise be required. In one illustrative embodiment of a method for converting a receive signal from a communication channel into a sequence of symbol decisions, the method includes, for each sampling interval: (a) generating a set of tentative symbol decisions each having a thermometer-coded representation with a least significant bit and a most significant bit; (b) providing each least significant bit as a thermometer-coded input to a first multiplexer; (c) providing each most significant bit as a thermometer-coded input to a second multiplexer; (d) applying a thermometer-coded representation of a preceding output symbol decision as selection inputs to the first and second multiplexers; and (e) capturing a current output symbol decision having a thermometer-coded representation that includes outputs of the first and second multiplexer.

21 Claims, 5 Drawing Sheets

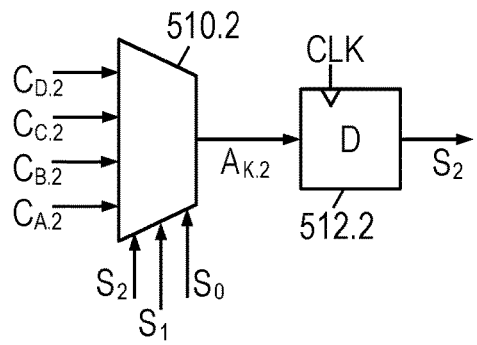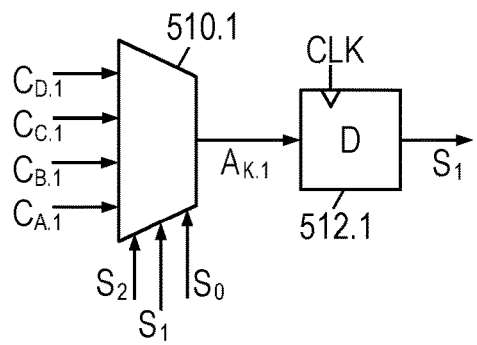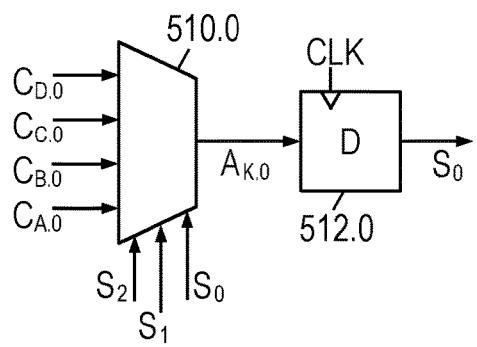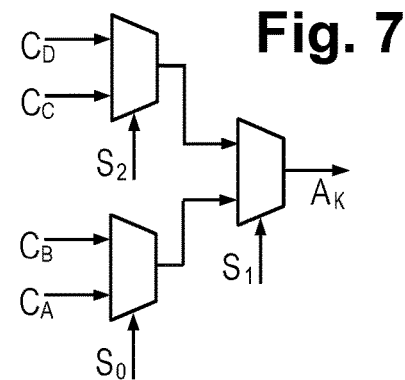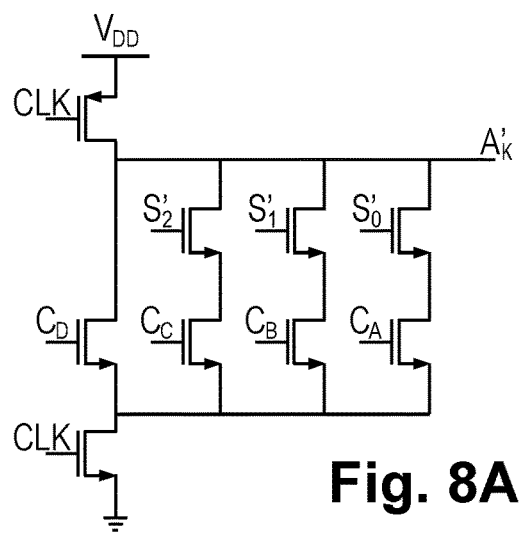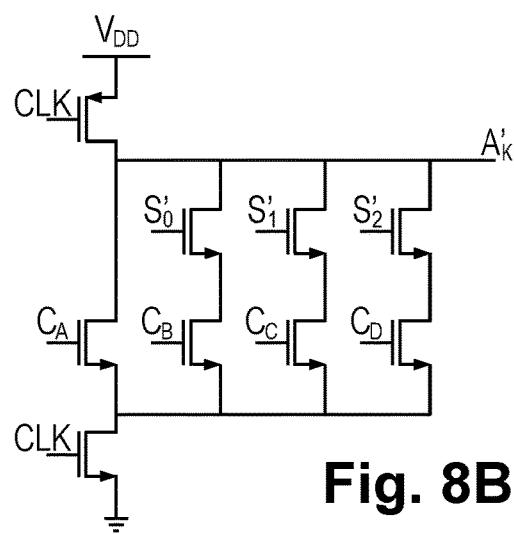
Fig. 6
Fig. 7
Fig. 8A
Fig. 8B

THERMOMETER-ENCODED UNROLLED DFE SELECTION ELEMENT

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by a sequence of two or more symbols.

Many digital communication links use only one bit per symbol; a binary '0' is represented by one symbol (e.g., an electrical voltage or current signal within a first range), and binary '1' by another symbol (e.g., an electrical voltage or current signal within a second range), but higher-order signal constellations are known and frequently used. In 4-level pulse amplitude modulation (PAM4), each symbol interval may carry any one of four symbols, often denoted as −3, −1, +1, and +3. Two binary bits can thus be represented by each symbol.

Channel non-idealities produce dispersion which may cause each symbol to perturb its neighboring symbols, causing intersymbol interference (ISI). ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers (DFE) are often preferred for their ability to combat ISI without inherently requiring noise amplification. As the name suggests, a DFE employs a feedback path to remove ISI effects derived from previously-decided symbols.

A standard textbook implementation of a DFE employs a number of cascaded circuit elements to generate the feedback signal and apply it to the received input signal, all of which must complete their operation in less than one symbol interval. At a symbol interval of 100 picoseconds (for a symbol rate of 10 GSymbol/s), this implementation is challenging with currently available silicon processing technologies. Even data rates around a few gigabits per second can be difficult to achieve due to performance limitations of silicon-based integrated circuits.

Accordingly, certain proposed designs such as those disclosed in U.S. Pat. No. 8,301,036 ("High-speed adaptive decision feedback equalizer") and U.S. Pat. No. 9,071,479 ("High-speed parallel decision feedback equalizer") employ alternative implementations that exploit the use of precomputation modules, though in many cases the complexity and power requirements of such modules may be excessive, constituting a dominant fraction (>80%) of the areal and power requirements for the receiving device.

SUMMARY

Accordingly, there is disclosed herein a DFE selection element implementation that reduces the degree of unrolling that might otherwise be required. In one illustrative embodiment of a method for converting a receive signal from a communication channel into a sequence of symbol decisions, the method includes, for each sampling interval: (a) generating a set of tentative symbol decisions each having a thermometer-coded representation with a least significant bit and a most significant bit; (b) providing each least significant bit as a thermometer-coded input to a first multiplexer; (c) providing each most significant bit as a thermometer-coded input to a second multiplexer; (d) applying a thermometer-coded representation of a preceding output symbol decision as selection inputs to the first and second multiplexers; and (e) capturing a current output symbol decision having a thermometer-coded representation that includes outputs of the first and second multiplexer.

An illustrative digital communications channel receiver embodiment includes: a precompensation unit that produces at each of multiple time intervals a set of tentative symbol decisions each having a multibit thermometer-coded representation, each tentative symbol decision accounting for trailing intersymbol interference from a speculative preceding symbol value; and a recursive selection unit that includes bitwise multiplexers to select from each set a current symbol decision based on a preceding symbol decision, the current and preceding symbol decisions each having a multibit thermometer-coded representation.

An illustrative decision feedback equalizer (DFE) selection unit embodiment includes: bitwise multiplexers each operating on corresponding bits from a set of thermometer-coded tentative symbol decisions, the corresponding bits for each bitwise multiplexer forming a thermometer-coded input value; and a latch that captures outputs from the bitwise multiplexers as a thermometer-coded representation of a current symbol decision, and that provides a thermometer-coded representation of a preceding symbol decision as a selection value to each of the bitwise multiplexers.

Each of the foregoing embodiments may be implemented individually or conjointly, together with one or more of the following features in any suitable combination: 1. each of the multiplexers consists of parallel circuit paths between an output node and a common node, each path having at most one selection bit controlled transistor in series with at most one input bit controlled transistor. 2. one of the parallel circuit paths has a least significant selection bit controlling a transistor in series with a transistor controlled by a least significant input bit. 3. one of the parallel circuit paths has a most significant selection bit controlling a transistor in series with a transistor controlled by a most significant input bit. 4. the tentative symbol decisions, the preceding output symbol decision, and the current output symbol decision, each have a thermometer-coded representation with one or more bits of intermediate significance. 5. processing the receive signal with a front end filter to produce a filtered signal having reduced leading intersymbol interference. 6. deriving a feedback signal from past output symbol decisions, and subtracting the feedback signal from the filtered signal to obtain a combined signal having reduced trailing intersymbol interference. 7. operating on the combined signal with a precompensation unit to provide each set of tentative symbol decisions. 8. the tentative symbol decisions are chosen from a pulse amplitude modulation (PAM) constellation having at least four symbol values. 9. each of said bitwise multiplexers receives a corresponding representation bit from each tentative symbol decision. 10. the corresponding representation bits are provided as a thermometer-coded representation of an input value. 11. a front end filter that processes a receive signal to produce a filtered signal having reduced leading intersymbol interference. 12. a feedback filter that derives a feedback signal from past symbol decisions to reduce trailing intersymbol interference.

BRIEF DESCRIPTION OF THE DRAWINGS

FIG. 6 shows an illustrative recursive selection unit for the DFE of FIG. 5.

FIG. 7 shows a first illustrative DFE selection unit implementation using thermometer encoding.

FIG. 8A shows an illustrative simplified DFE selection unit implementation for a positive post-cursor coefficient.

FIG. 8B shows an illustrative simplified DFE selection unit implementation for a negative post-cursor coefficient.

Figure 1:
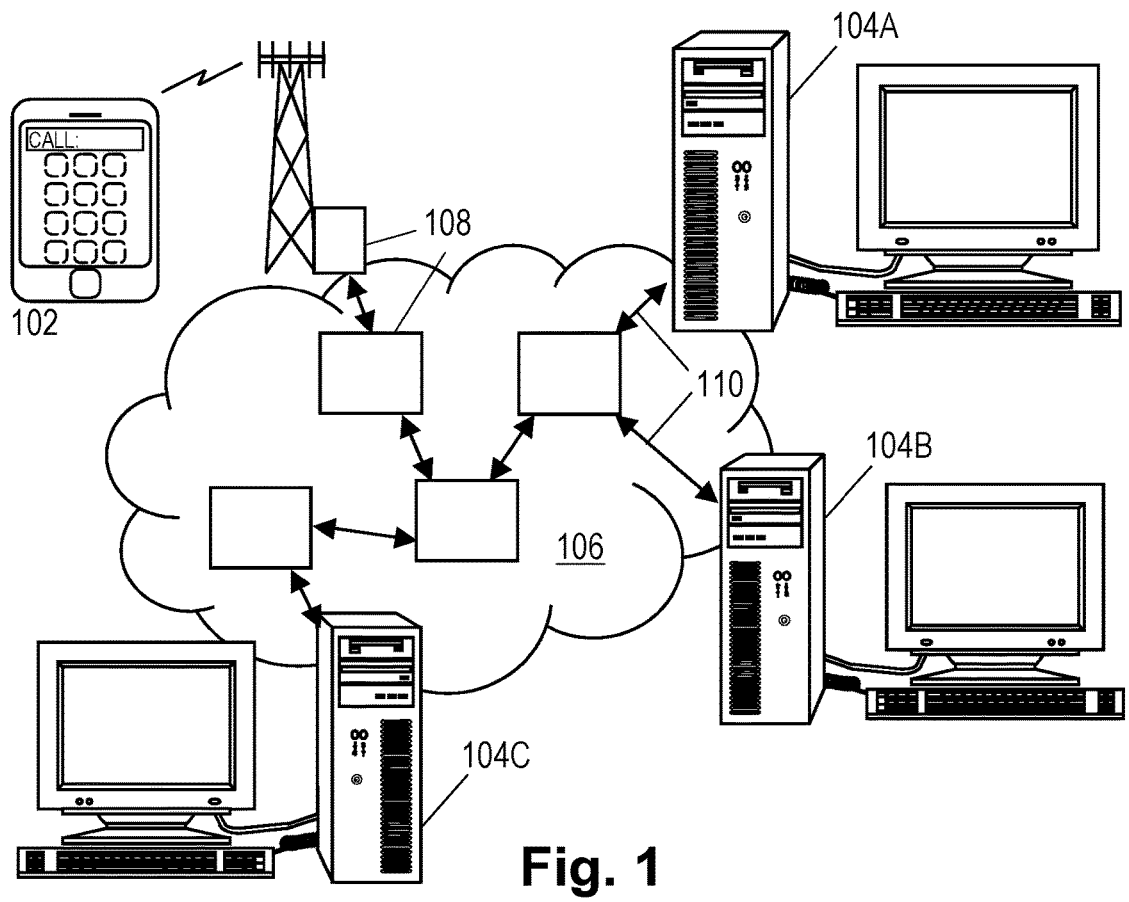
FIG. 1 shows an illustrative computer network.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

The disclosed apparatus and methods are best understood in the context of the larger environments in which they operate. Accordingly, FIG. 1 shows an illustrative communications network including mobile devices 102 and computer systems 104A-C coupled via a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components.

Figure 2:
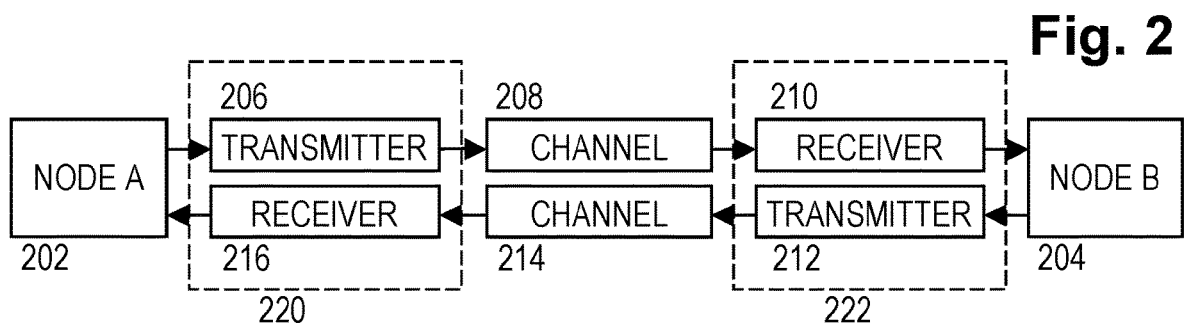
FIG. 2 is a function-block diagram of an illustrative point-to-point communication link.

FIG. 2 is a diagram of an illustrative point-to-point communication link that may be representative of links 110 in FIG. 1. The illustrated embodiment includes a first node 202 ("Node A") in communication with a second node 204 ("Node B"). Nodes A & B can each be, for example, any one of mobile devices 102, equipment items 108, computer systems 104A-C, or other sending/receiving devices suitable for high-rate digital data communications.

Coupled to Node A is a transceiver 220, and coupled to Node B is a transceiver 222. Communication channels 208 and 214 extend between the transceivers 220 and 222. The channels 208 and 214 may include, for example, transmission media such as fiber optic cables, twisted pair wires, coaxial cables, backplane transmission lines, and wireless communication links. (It is also possible for the channel to be a magnetic or optical information storage medium, with the write-read transducers serving as transmitters and receivers.) Bidirectional communication between Node A and Node B can be provided using separate channels 208 and 214, or in some embodiments, a single channel that transports signals in opposing directions without interference.

A transmitter 206 of the transceiver 220 receives data from Node A and transmits the data to the transceiver 222 via a signal on the channel 208. The channel signal may be, for example, an electrical voltage, an electrical current, an optical power level, a wavelength, a frequency, or a phase value. A receiver 210 of the transceiver 222 receives the signal via the channel 208, uses the signal to reconstruct the transmitted data, and provides the data to Node B. Similarly, a transmitter 212 of the transceiver 222 receives data from Node B, and transmits the data to the transceiver 220 via a signal on the channel 214. A receiver 216 of the transceiver 220 receives the signal via the channel 214, uses the signal to reconstruct the transmitted data, and provides the data to Node A.

Figure 3:
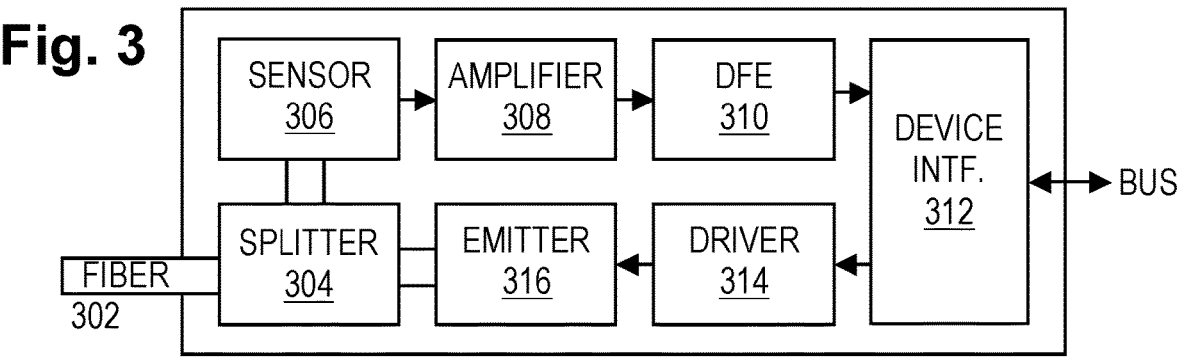
FIG. 3 is a function-block diagram of an illustrative fiber optic interface module.

FIG. 3 illustrates a transceiver embodiment specific to fiber optic signaling with a function block diagram of an illustrative fiber optic interface module. The optical fiber 302 couples to a splitter 304 which creates two optical paths to the fiber: one for receiving and one for transmitting. A sensor 306 is positioned on the receiving path to convert one or more received optical signals into corresponding analog (electrical) receive signals that are amplified by amplifier 308 in preparation for processing by a decision feedback equalizer (DFE) 310. The DFE 310 converts the received signal into a sequence of symbol decisions. A device interface 312 buffers the sequence of symbol decisions and, in at least some embodiments, includes forward error correction (FEC) decoding and payload extraction logic to derive a received data stream from the sequence of symbol decisions. The device interface 312 then makes the received data stream available to the host node via an internal data bus in accordance with a standard I/O bus protocol.

Conversely, data for transmission can be communicated by the host node via the bus to device interface 312. In at least some embodiments, the device interface 312 packetizes the data with appropriate headers and end-of-frame markers, optionally adding a layer of FEC coding and/or a checksum. Driver 314 accepts a transmit data stream from interface 312 and converts the transmit data stream into an analog electrical drive signal for emitter 316, causing the emitter to generate optical channel signals that are coupled via splitter 304 to the optical fiber 302.

Figure 4:
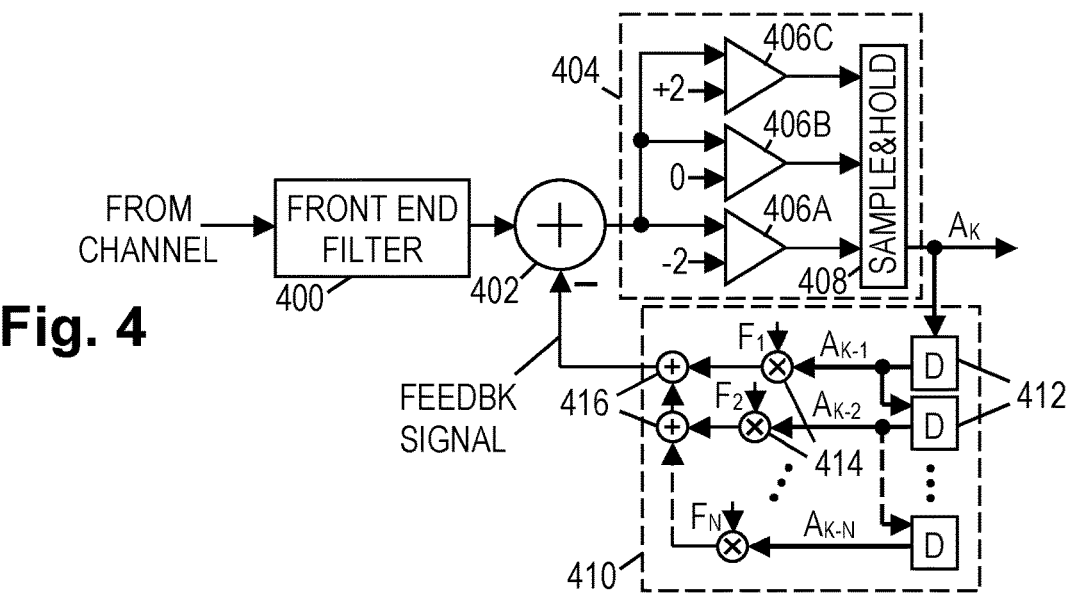
FIG. 4 shows an illustrative fully-rolled PAM4 decision feedback equalizer (DFE) implementation with thermometer-encoding.

As previously mentioned, a DFE is included in the receive chain to combat intersymbol interference (ISI) that results from signal dispersion in the channel. FIG. 4 shows an illustrative, fully-rolled implementation of a DFE that produces a thermometer-encoded sequence of symbol decisions.

In FIG. 4, an analog or digital front end filter 400 operates on the receive signal to shape the overall channel response of the system and minimize the effects of leading ISI on the current symbol. As part of the shaping of the overall channel response, the front end filter 400 may also be designed to shorten the channel response of the filtered signal while minimizing any attendant noise enhancement. A summer 402 subtracts a feedback signal from the output of the front end filter 400 to minimize the effects of trailing ISI on the current symbol.

A decision element 404 then digitizes the combined signal to produce a stream of output data symbols (denoted $A_k$, where k is the time index). In the illustrated example, the symbols are presumed to be PAM4 (−3, −1, +1, +3), making the decision thresholds −2, 0, and +2 for comparators 406A-406C, respectively. (The unit for expressing symbol and threshold values is omitted for generality, but for explanatory purposes may be presumed to be volts. In practice, a scale factor will be employed.) An optional sample and hold unit 408 captures the comparator outputs as a unary number (also known as a "thermometer coded") representation, e.g., 000 to represent −3, 001 to represent −1, 011 to represent +1, and 111 to represent +3.

Though the foregoing thermometer code is the one employed below, the disclosed principles will still apply for any of the thermometer code variants, such as when {−3,−1,+1,+3} are represented by {111, 110, 100, 000}, {000, 100, 110, 111}, or {111, 011, 001, 000}. That is, in unary coding, the 1's can be exchanged with 0's as the counted symbol, and the most-significant to least-significant bit order can be reversed, so long as the convention is maintained throughout the design.

Though PAM4 is the focus of the present disclosure, the principles apply to all PAM constellations with more than 2 symbols. Where M is an integer representing the number of symbols in the PAM constellation, M−1 bit lines are used to carry the thermometer code representation of the output symbol decision $A_k$.

The DFE generates the feedback signal with a feedback filter 410 having a series of delay elements 412 (e.g., latches, flip flops, or registers) that store the recent output symbol decisions ($A_{k-1}$ ... $A_{k-N}$, where N is the number of filter coefficients $f_i$). A set of multipliers 414 determines the product of each symbol with a corresponding filter coefficient, and a series of summers 416 combines the products to obtain the feedback signal.

As an aside, we note here that the circuitry for the front end filter 400 and the feedback filter 410 can operate on analog signals, or conversely, it can be implemented using digital circuit elements and/or software in a programmable processor. Further, a timing recovery unit and a filter coefficient adaptation unit augment the operation of the DFE, but such considerations are addressed in the literature and known to those skilled in the art, so we will not dwell on them here.

In the embodiment of FIG. 4, the feedback filter 410 must complete its operation in less than one symbol interval because its output depends in part upon the immediately preceding decision. At very high data rates, one symbol interval does not provide sufficient time to finish the filter multiplications and the feedback subtraction.

One solution to this timing constraint is to at least partly "unroll" the feedback filter 410.

Figure 5:
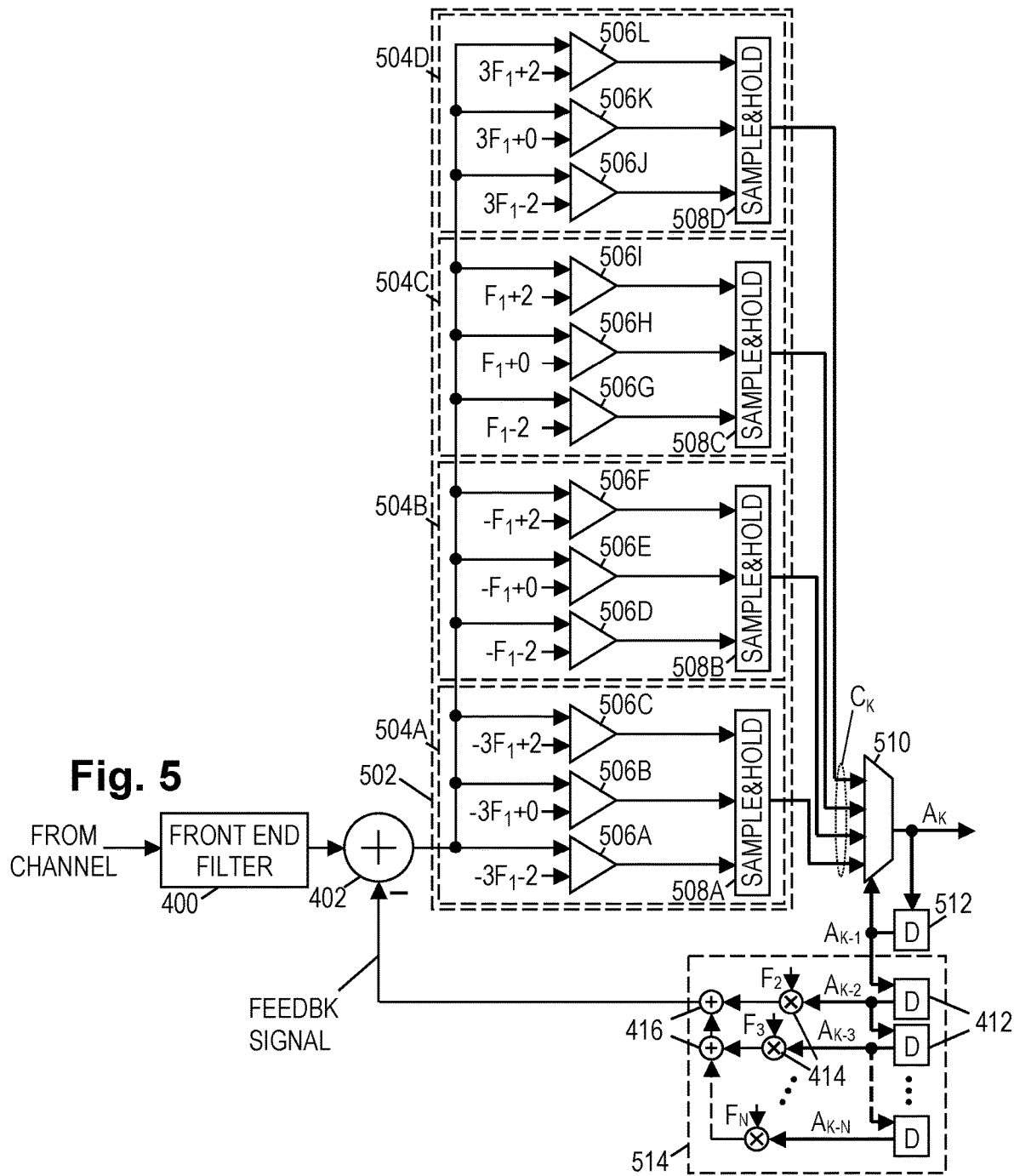
FIG. 5 shows an illustrative PAM4, thermometer-encoded DFE employing a one-tap precomputation unit.

FIG. 5 shows an illustrative variation of FIG. 4 that unrolls the feedback filter by one tap. The embodiment of FIG. 5 employs the same front end filter 400, but summer 402 subtracts a feedback signal to remove the trailing ISI caused by all but the symbol immediately preceding the current symbol. (The current symbol $A_k$ may be termed the "cursor" symbol, and the immediately preceding symbol is $A_{k-1}$.) For each possible value of the immediately preceding symbol, the precompensation unit 502 provides a decision element 504A-504D. Decision element 504A speculatively assumes that the preceding symbol was −3, and rather than subtracting the ISI that would result from this symbol (−3*$f_1$, where $f_1$ is the coefficient of the first tap in the feedback filter 410), the thresholds of comparators 506A-506C have been adjusted relative to the thresholds of comparators 406A-406C by adding −3*$f_1$, enabling decision element 504A to form a tentative symbol decision based on this speculative assumption.

Similarly, decision elements 504B, 504C, and 504D employ comparators with suitably adjusted thresholds to render tentative decisions under the speculative assumptions that the preceding symbol was −1, +1, and +3, respectively. The sample and hold units 508A-508D of the precompensation unit 502 supply these tentative decisions C to a multiplexer 510, which chooses the proper tentative decision based on the immediately preceding symbol decision $A_{k-1}$ stored by delay element 512. Feedback filter 514 has a reduced number of taps (filter coefficients), but otherwise operates similarly to feedback filter 410.

Although this unrolling step increases the number of elements in the DFE loop (i.e., in the loop including summer 402, precompensation unit 502, multiplexer 510, delay element 512, and feedback filter 514), only the elements of the inner loop (i.e., multiplexer 510 and delay element 512) need to achieve their operations in less than one symbol interval. The remaining DFE loop elements can take up to two symbol intervals to complete their pipelined operation. As described by the references cited in the Background section, further unrolling can be performed if the inner loop elements are unable to complete their operations in less than one symbol interval, but this approach would further increase the number of elements in the DFE.

A preferred approach is to focus on the operation of the inner loop, at times referred to herein as the "recursive DFE selection element", optimizing the design as needed to avoid any need for further unrolling. With the thermometer encoding that has been chosen for the tentative symbol decisions $C_k$ and the output symbol decisions $A_k$, together with another observation set forth below, it becomes possible to simplify the DFE selection element in a fashion that significantly reduces its operation time.

FIG. 6 is an illustrative DFE selection unit in which multiplexer 510 has been split into bitwise multiplexers 510.0, 510.1, and 510.2, one for each bit of the thermometer-coded output symbol decision $A_k$. The "0.0" refers to the least significant bit of the thermometer-coded representation, "0.1" to the next-least significant, and "0.2" to the most significant bit. Where the coded representation includes additional bits (e.g., a PAM constellation having more than 4 symbols), the splitting of multiplexer 510 will include additional multiplexers.

Similarly, delay element 512 is split into bitwise delay elements 512.0 through 512.2, one for each bit of the coded representation. The output of the delay elements, collectively labeled in FIG. 5 as $A_{k-1}$, is labeled here as $S_0$, $S_1$, and $S_2$, respectively, and coupled to the selection inputs of the multiplexers 510.0-510.2.

The data inputs of multiplexer 510.0 are the least significant bits from the outputs $C_k$ of the precompensation unit 502, labeled $C_{A.0}$, $C_{B.0}$, $C_{C.0}$, and $C_{D.0}$ to correspond with decision elements 504A, 504B, 504C, and 504D, respectively. The data inputs for multiplexer 510.1 are the next-least significant bits from the outputs $C_k$ of the precompensation unit 502, and the data inputs for multiplexer are the most significant bits. Other than which bit they are associated with, the split multiplexers 510.x and delay elements 512.x operate identically and may each be implemented similarly.

FIG. 7 shows one illustrative way to implement a 4:1 multiplexer 510 using three 2:1 multiplexers controlled by the thermometer-coded selection inputs. The Boolean equation for this implementation is:

$$A_k = C_D * S_2 * S_1 + C * S'_2 * S_1 + C_B * S_0 * S'_1 + C_A * S'_0 * S'_1$$

where * represents a logical "AND", + represents a logical "OR", and ' indicates the logical complement "NOT". Notably, each of the four terms includes two AND operations, which limit the operating speed of the DFE selection element.

Considering FIGS. 5 and 6 together, one may observe that the inputs to a given split multiplexer, say 510.0, are from comparators having monotonically staggered thresholds, e.g., $-2-3f_1$, $-2-f_1$, $-2+f_1$, and $-2+3f_1$. For multiplexer 510.1, the comparator thresholds are $0-3f_1$, $0-f_1$, $0+f_1$, and $0+3f_1$, and for multiplexer 510.2, the comparator thresholds are $2-3f_1$, $2-f_1$, $2+f_1$, and $2+3f_1$.

In other words, the multiplexer inputs are ordered to exhibit a thermometer coding characteristic. If $f_1$ (the feedback filter tap representing ISI from the immediately preceding symbol) is positive, as is typically the case for most high-rate communications across a lossy channel, the set of possible inputs for each multiplexer includes only {0000, 0001, 0011, 0111, 1111}. This observation enables further optimization of the DFE selection element. With the construction of a truth table, it can be shown that the operation of a 4:1 multiplexer with thermometer-coded data and selection inputs is expressible as:

$$A_k = C_D + C_C*S'_2 + C_B*S'_1 + C_A*S'_0$$

Notably, none of the terms has more than one AND operation, easing the operating rate limitation of the DFE selection element.

This Boolean equation (and thus the multiplexer) can be implemented using any suitable digital logic technology. FIG. 8A is a schematic showing one illustrative implementation using domino logic to decrease loading of the input signals. When the clock signal CLK is low, the p-channel MOSFET conducts current from the power supply voltage VDD to charge the output line $A'_k$ while the n-channel MOSFET receiving the clock signal prevents current flow to the ground node. This is referred to as the "reset phase".

When the clock signal CLK is high, the p-channel MOSFET isolates the output line from the power supply voltage, and the n-channel MOSFET enables current flow to ground, depending on the conduction state of the other n-channel MOSFETs. If signal $C_D$ is high, the output line $A'_k$ discharges. If signals $C_C$ and $S'_2$ are asserted, the output line discharges. If signals $C_B$ and $S'_1$ are asserted, the output line discharges. If signals $C_A$ and $S'_0$ are asserted, the output line discharges. Otherwise the output line remains asserted.

In this way, the state of the output line (or more precisely, the complement of this state) represents the result of the Boolean equation given above.

If f (the feedback filter tap representing ISI from the immediately preceding symbol) is negative the set of possible inputs for each multiplexer includes only {0000, 1000, 1100, 1110, 1111}. If the data inputs, and hence the multiplexer output, are logically complemented, the implementation of FIG. 8A still works.

If complementing the inputs and outputs is inconvenient, a truth table can be constructed to show that for this thermometer coding characteristic, the Boolean equation becomes:

$$A_k = C_A + C_B S'_0 + C_C*S'_1 + C_D*S'_2$$

FIG. 8B is an illustrative implementation of this equation using domino logic. A comparison with FIG. 8A reveals that this simply amounts to a re-ordering of the LSB-to-MSB representation in the thermometer coding. In other words, the FIG. 8A implementation can be used for both positive and negative $f_1$, with a downstream decoding of the output symbol decisions being made contingent on the sign of $f_1$.

Figure 9:
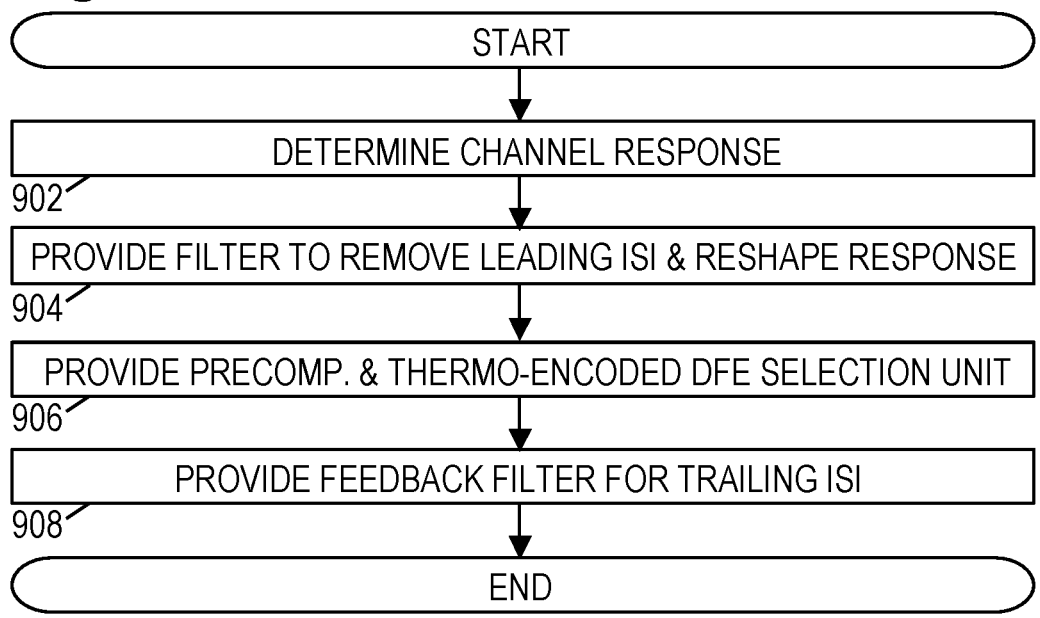
FIG. 9 is a flowchart of an illustrative method for equalizing high speed receiving devices.

FIG. 9 is a flowchart of an illustrative method for providing a high-speed receiving device with DFE-based equalization. It begins in block 902 with a determination of the channel response, which may optionally include matched filtering or any other optimal filtering operation by the front end filter 400. Preferably, the front end filter 400 operates to provide an initial channel response that is causal, monic, and minimum phase in accordance with techniques known in the literature. (See, e.g., Cioffi et al., "MMSE Decision-Feedback Equalizers and Coding-Part I: Equalization Results", IEEE Trans. Comm., 43(10):2582-2594, November 1995.) Other suitable optimization criteria discussed in the literature include optimization penalties to provide for a reduced length of the filtered channel response and limited noise enhancement. In some implementations, the channel response determination is performed by simulation modeling during the device design process, but may alternatively be determined during a training phase when the communications link is established and/or by adaptation during the use of the channel.

The manufacturing implementation of the DFE begins in block 904, with the creation of the desired front end filter 400 with coefficients and/or an adaptation mechanism enabling the filter to eliminate or substantially reduce leading ISI, possibly in combination with spectral shaping and noise reduction. In block 906, precompensation unit is provided to unroll at least one tap of the feedback filter and supply a thermometer-coded set of tentative decisions to a recursive DFE selection unit. The DFE selection unit is provided to produce output symbol decisions that may also be thermometer-encoded. In block 908, an optional feedback filter is provided to compensate for any trailing ISI that remains.

Numerous alternative forms, equivalents, and modifications will become apparent to those skilled in the art once the above disclosure is fully appreciated. For example, the various DFE components can be implemented with analog electrical components or with digital electrical components. In many cases, the order of elements can be changed, e.g., modifying the feedback filter implementation. It is intended that the claims be interpreted to embrace all such alternative forms, equivalents, and modifications that are encompassed in the scope of the appended claims.

What is claimed is:

1. A method of converting a receive signal from a communication channel into a sequence of symbol decisions, the method comprising, for each sampling interval:
   generating, via a precompensation unit, a set of tentative symbol decisions each having a thermometer-coded representation with a least significant bit and a most significant bit;
   providing each least significant bit as a thermometer-coded input to a first multiplexer;
   providing each most significant bit as a thermometer-coded input to a second multiplexer;
   applying a thermometer-coded representation of a preceding output symbol decision as selection inputs to the first and second multiplexers; and
   capturing a current output symbol decision having a thermometer-coded representation that includes outputs of the first and second multiplexer.

2. The method of claim 1, wherein each of the first and second multiplexers consists of parallel circuit paths between an output node and a common node, each path having at most one selection bit controlled transistor in series with at most one input bit controlled transistor.

3. The method of claim 2, wherein one of the parallel circuit paths has a least significant selection bit controlling a transistor in series with a transistor controlled by a least significant input bit.

4. The method of claim 2, wherein one of the parallel circuit paths has a most significant selection bit controlling a transistor in series with a transistor controlled by a most significant input bit.

5. The method of claim 1, wherein the tentative symbol decisions, the preceding output symbol decision, and the current output symbol decision, each have a thermometer-coded representation with one or more bits of intermediate significance.

6. The method of claim 1, wherein said generating includes:
processing the receive signal with a front end filter to produce a filtered signal having reduced leading intersymbol interference.

7. The method of claim 6, wherein said generating further includes:
deriving a feedback signal from past output symbol decisions;
subtracting the feedback signal from the filtered signal to obtain a combined signal having reduced trailing intersymbol interference; and
operating on the combined signal with a precompensation unit to provide each set of tentative symbol decisions.

8. The method of claim 1, wherein the tentative symbol decisions are chosen from a pulse amplitude modulation (PAM) constellation having at least four symbol values.

9. A channel interface module that comprises a receiver having:
a precompensation unit that produces at each of multiple time intervals a set of tentative symbol decisions each having a multibit thermometer-coded representation, each tentative symbol decision accounting for trailing intersymbol interference from a speculative preceding symbol value; and
a recursive selection unit that includes bitwise multiplexers to select from each set a current symbol decision based on a preceding symbol decision, the current and preceding symbol decisions each having a multibit thermometer-coded representation.

10. The channel interface module of claim 9, wherein each of said bitwise multiplexers receives a corresponding representation bit from each tentative symbol decision, and the corresponding representation bits are provided as a thermometer-coded representation of an input value.

11. The channel interface module of claim 10, wherein each of the bitwise multiplexers consists of parallel circuit paths between an output node and a common node, each path having at most one selection bit controlled transistor in series with at most one input bit controlled transistor.

12. The channel interface module of claim 11, wherein the thermometer-coded representations of the tentative symbol decisions, the preceding symbol decision, and the current symbol decision, each have a least significant bit, one or more intermediate significance bits, and a most significant bit.

13. The channel interface module of claim 12, wherein one of the parallel circuit paths has a least significant bit of the preceding symbol decision controlling a transistor in series with a transistor controlled by a least significant bit of the input value.

14. The channel interface module of claim 12, wherein one of the parallel circuit paths has a most significant bit of the preceding symbol decision controlling a transistor in series with a transistor controlled by a most significant bit of the input value.

15. The channel interface module of claim 9, wherein the receiver further includes:
a front end filter that processes a receive signal to produce a filtered signal having reduced leading intersymbol interference; and
a feedback filter that derives a feedback signal from past symbol decisions to reduce trailing intersymbol interference.

16. The channel interface module of claim 9, wherein the tentative symbol decisions are chosen from a pulse amplitude modulation (PAM) constellation having at least four symbol values.

17. A decision feedback equalizer (DFE) comprising:
a precompensation unit that produces at each of multiple time intervals a set of thermometer-coded tentative symbol decisions, each thermometer-coded tentative symbol decision accounting for trailing intersymbol interference from a speculative preceding symbol value;
bitwise multiplexers each operating on corresponding bits from the set of thermometer-coded tentative symbol decisions, the corresponding bits for each bitwise multiplexer forming a thermometer-coded input value; and
a latch that captures outputs from the bitwise multiplexers as a thermometer-coded current symbol decision, and that provides a thermometer-coded preceding symbol decision as a selection value to each of the bitwise multiplexers.

18. The DFE selection unit of claim 17, wherein each of the bitwise multiplexers consists of parallel circuit paths between an output node and a common node, each path having at most one selection bit controlled transistor in series with at most one input bit controlled transistor.

19. The DFE selection unit of claim 18, wherein the thermometer-coded tentative symbol decisions, the thermometer-coded preceding symbol decision, and the thermometer-coded current symbol decision, each have a least significant bit, one or more intermediate significance bits, and a most significant bit.

20. The DFE selection unit of claim 19, wherein one of the parallel circuit paths has a least significant bit of the thermometer-coded preceding symbol decision controlling a transistor in series with a transistor controlled by a least significant bit of the thermometer-coded input value.

21. The DFE selection unit of claim 19, wherein one of the parallel circuit paths has a most significant bit of the thermometer-coded preceding symbol decision controlling a transistor in series with a transistor controlled by a most significant bit of the thermometer-coded input value.

* * * * *